US011802005B2

(12) United States Patent
Zhou et al.

(10) Patent No.: US 11,802,005 B2
(45) Date of Patent: Oct. 31, 2023

(54) FLIP-OVER MECHANISM AND FLIP-OVER SYSTEM

(71) Applicant: Wistron Corporation, New Taipei (TW)

(72) Inventors: Zhong-Bo Zhou, New Taipei (TW); Bao-Hong Zhao, New Taipei (TW); Zhong-Hua Lei, New Taipei (TW); Xiao-Hu Xie, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 17/511,657

(22) Filed: Oct. 27, 2021

(65) Prior Publication Data

US 2023/0059259 A1  Feb. 23, 2023

(30) Foreign Application Priority Data

Aug. 23, 2021 (CN) .......................... 202110969573.5

(51) Int. Cl.
*B65G 47/24* (2006.01)
*B65G 47/248* (2006.01)

(52) U.S. Cl.
CPC ................................. *B65G 47/248* (2013.01)

(58) Field of Classification Search
CPC ...... B65G 47/24; B65G 47/44; B65G 47/248; B65G 47/252
See application file for complete search history.

(56) References Cited

U.S. PATENT DOCUMENTS

| 1,872,402 | A | * | 8/1932 | Candee | B65G 47/24 198/402 |
| 2,776,034 | A | * | 1/1957 | Jordt | B65G 47/24 193/47 |
| 2,799,384 | A | * | 7/1957 | Rutherford | B65G 47/44 198/603 |
| 2,981,394 | A | * | 4/1961 | Stecher | B65G 47/24 193/47 |
| 3,263,786 | A | * | 8/1966 | Hannah | B65B 7/2807 193/31 R |

(Continued)

FOREIGN PATENT DOCUMENTS

| GB | 1338394 A | * 11/1973 | ............. A21C 15/00 |
| TW | 200848336 A | 12/2008 | |

(Continued)

OTHER PUBLICATIONS

Examination report dated Feb. 11, 2022, listed in related Taiwan patent application No. 110132711.

*Primary Examiner* — Gregory W Adams
(74) *Attorney, Agent, or Firm* — McClure, Qualey & Rodack, LLP

(57) ABSTRACT

A system includes a flip-over mechanism. The flip-over mechanism includes a base and a guiding element. The base includes a bottom surface and a flipping surface. The guiding element includes a feeding surface. There is a feeding angle between the feeding surface and the bottom surface. The feeding surface faces the flipping surface. An opening direction of the flipping surface faces the feeding surface. There is a flip-over spacing between guiding element and the flipping surface. The flip-over mechanism is adapted to flip, by 180 degrees, a workpiece that enters from the feeding surface.

18 Claims, 18 Drawing Sheets

(56) References Cited

U.S. PATENT DOCUMENTS 4,712,974 A * 12/1987 Kane .................. B65G 47/24
414/757
7,264,107 B2 * 9/2007 Lawrence ............... A21C 9/08
198/603
7,854,308 B2 * 12/2010 Kuo .................... B65G 47/252
198/406

FOREIGN PATENT DOCUMENTS

| TW | 200938343 A | 9/2009 |
| TW | 201309573 A | 3/2013 |

\* cited by examiner

FLIP-OVER MECHANISM AND FLIP-OVER SYSTEM

CROSS-REFERENCE TO RELATED APPLICATION

This non-provisional application claims priority under 35 U.S.C. § 119(a) to Patent Application No. 202110969573.5 filed in China, P.R.C. on Aug. 23, 2021, the entire contents of which are hereby incorporated by reference.

BACKGROUND

Technical Field

The disclosure relates to a flip-over mechanism, and in particular, to a flip-over mechanism and a flip-over system including same.

Related Art

In product manufacturing processes, workpieces are flipped over in some manufacturing processes for the workpieces to proceed to a next manufacturing process more easily. Generally, a device for flipping over the workpieces is a mechanical arm. The mechanical arm clamps a workpiece, flips over the workpiece, and then places the workpiece back.

However, the mechanical arm may malfunction after being used for a specific period, requiring a manufacturer to repair or replace components of the mechanical arm from time to time or periodically, resulting in higher manufacturing costs of the manufacturer.

In addition, after being flipped over by the mechanical arm, some workpieces are not correctly placed back to a region in which the workpieces should be placed, which may affect the quality of the workpieces and further affect the next manufacturing process or the quality of the whole product.

SUMMARY

In view of the foregoing problems, the disclosure provides a flip-over mechanism and a system including the flip-over mechanism.

According to some embodiments, the flip-over mechanism includes a base and a guiding element. The base includes a bottom surface and a flipping surface. The guiding element includes a feeding surface, where there is a feeding angle between the feeding surface and the bottom surface, the feeding angle is greater than or equal to 20 degrees and less than or equal to 90 degrees, the feeding surface faces the flipping surface, an opening direction of the flipping surface faces the feeding surface, and there is a flip-over spacing between the guiding element and the flipping surface.

In some embodiments, the base includes a discharging surface and a blanking seat, the discharging surface is connected to the flipping surface, and the blanking seat is connected to the discharging surface and is lower than the discharging surface.

In some embodiments, the base includes two guiding walls, where the two guiding walls are located on opposite sides of the discharging surface and opposite sides of the blanking seat, and the two guiding walls are connected to the flipping surface. A spacing between the two guiding walls tapers from the flipping surface to the blanking seat.

In some embodiments, a spacing between two side walls is greater than an outer diameter of a workpiece, a spacing between the two guiding walls on the discharging surface is greater than the outer diameter of the workpiece, and a spacing between the two guiding walls on the blanking seat is substantially equal to the outer diameter of the workpiece.

In some embodiments, the guiding element further includes a feeding arc-surface, where the feeding arc-surface is connected to an end of the feeding surface facing the flipping surface, and a flipping radius of the flipping surface is larger than a feeding radius of the feeding arc-surface by 10 mm.

According to some embodiments, a flip-over system includes a flip-over mechanism and a mechanical arm. The mechanical arm includes a controller, a picking head, and a movable structure, where the movable structure is connected to the picking head, and the controller is configured to: actuate the movable structure to move the picking head to a first position for the picking head to perform a picking action; actuate the movable structure to move the picking head to a position above the feeding surface for the picking head to perform a release action; actuate the movable structure to move the picking head to a blanking seat for the picking head to perform the picking action; and actuate the movable structure to move the picking head to a second position for the picking head to perform the release action.

According to some embodiments, the flip-over mechanism flips over a workpiece by using the gravity of the workpiece rather than using any other power mechanism, thereby saving maintenance costs. No additional mechanism needs to be installed on the flip-over mechanism, thereby saving equipment costs in a workpiece flip-over process. According to some embodiments, the flip-over mechanism enables the workpiece to be flipped over at a high speed and a high success rate, thereby improving efficiency of an overall production line. According to some embodiments, a flip-over mechanism includes a blanking seat, and the workpiece is smoothly moved to the blanking seat after being flipped over, which is convenient for a subsequent manufacturing process.

BRIEF DESCRIPTION OF THE DRAWINGS

FIG. 8A, FIG. 8B, FIG. 8C-1, FIG. 8C-2, FIG. 8D, and FIG. 8E are continuous state diagrams of an embodiment of FIG. 1 for flipping over a workpiece;

FIG. 9A, FIG. 9B, FIG. 9C-1, FIG. 9C-2, FIG. 9D, and FIG. 9E are cross-sectional views corresponding to FIG. 8A to FIG. 8E at a position 2-2 in FIG. 1;

DETAILED DESCRIPTION

Figure 1:
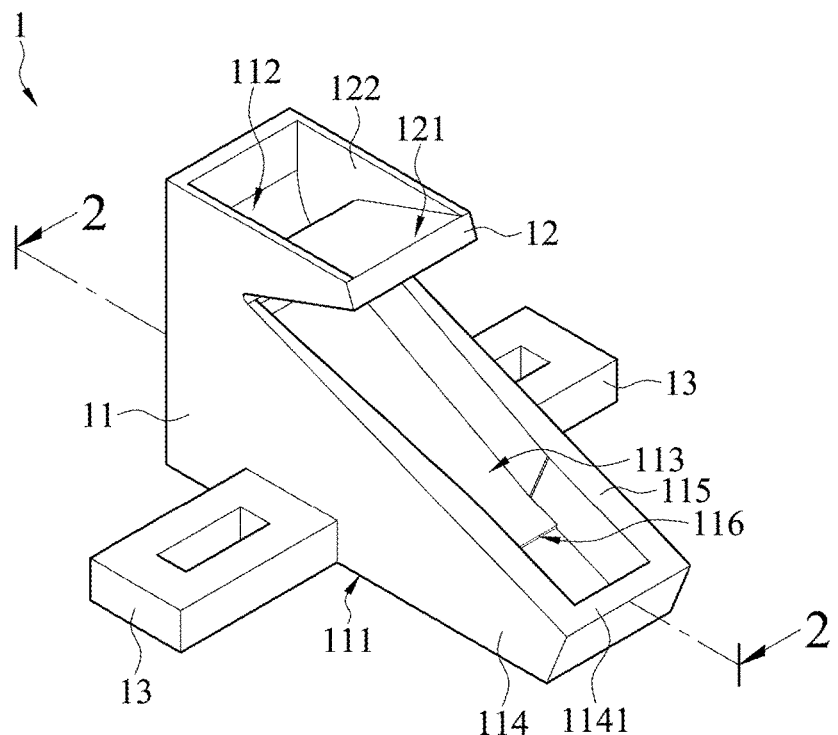
FIG. 1 is a three-dimensional view of a flip-over mechanism according to some embodiments.
Figure 2:
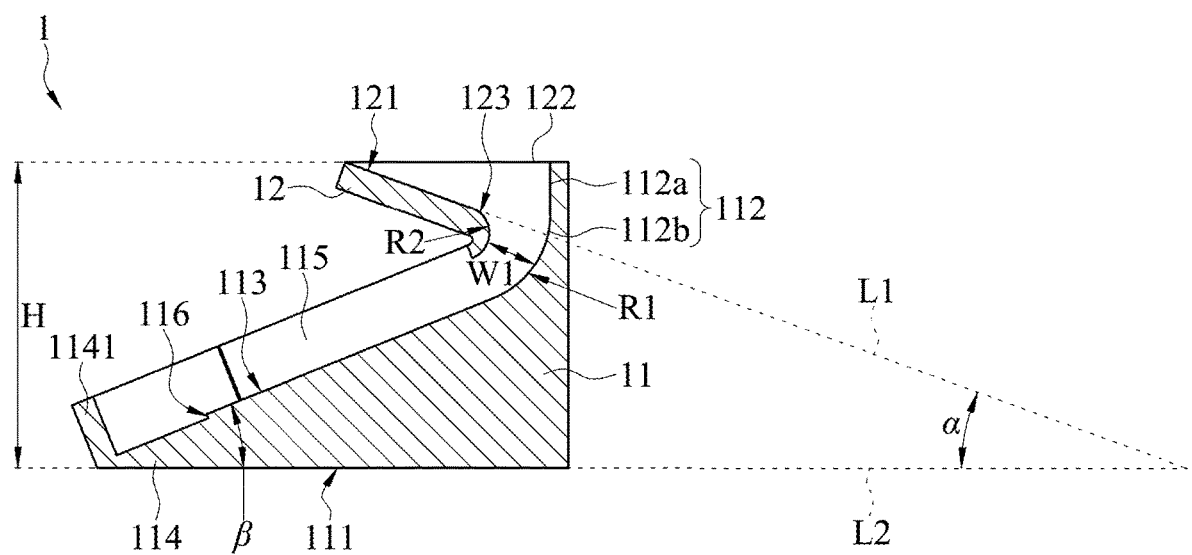
FIG. 2 is a cross-sectional view of an embodiment of FIG. 1 at a position 2-2.
Figure 3:
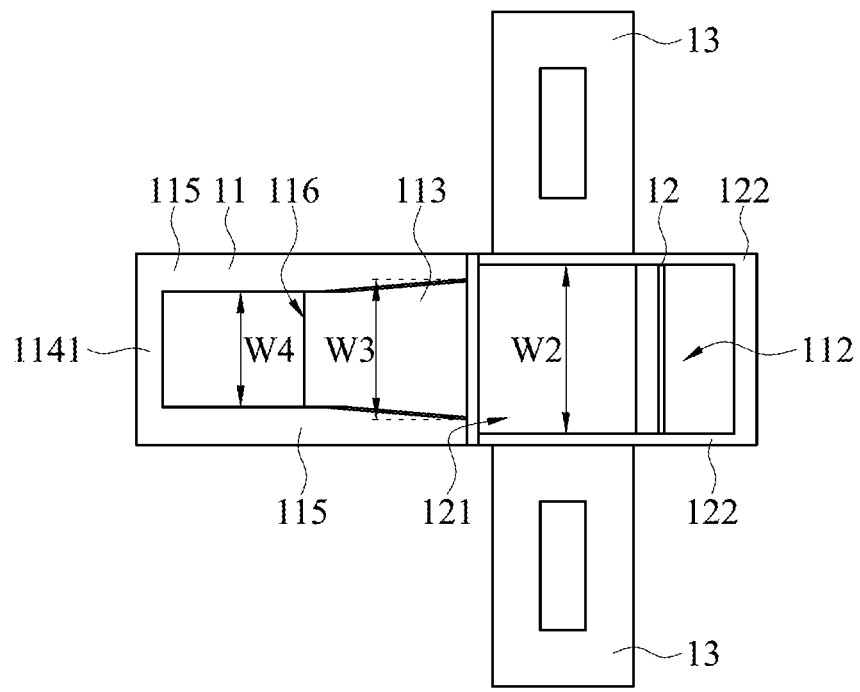
FIG. 3 is a top view of an embodiment of FIG. 1.

FIG. 1 is a three-dimensional view of a flip-over mechanism 1 according to some embodiments. FIG. 2 is a cross-sectional view of an embodiment of FIG. 1 at a position 2-2. FIG. 3 is a top view of an embodiment of FIG. 1.

According to some embodiments, the flip-over mechanism 1 includes a base 11 and a guiding element 12. The base 11 includes a bottom surface 111 and a flipping surface 112. The guiding element 12 includes a feeding surface 121. There is a feeding angle α between the feeding surface 121 and the bottom surface 111, where the feeding angle α is greater than or equal to 20 degrees and less than or equal to 90 degrees. In the embodiment shown in FIG. 1, the feeding angle α is 20 degrees. The feeding surface 121 faces the flipping surface 112, that is, the feeding surface 121 extends toward the flipping surface 112. An opening direction of the flipping surface 112 faces the feeding surface 121, that is, the flipping surface 112 is located on an imaginary line L1 extending from the feeding surface 121 toward the bottom surface 111. The opening direction of the flipping surface 112 refers to a direction toward a center of a flipping section 112b, but does not necessarily mean that the center of the flipping section 112b is on the feeding surface 121 or on the guiding element 12. There is a flip-over spacing W1 between the guiding element 12 and the flipping surface 112.

In some embodiments, the bottom surface 111 is a plane or a plane formed by supporting elements at a bottom of the base 11. For example, a plane formed by the base 11 is the bottom surface 111 when the base 11 is placed on a platform and the flip-over mechanism 1 is in a gravitational balance. In this embodiment, the bottom surface 111 is a plane formed by three contact points when the base 11 is located on a platform and reaches a gravitational balance. In some embodiments, the flip-over mechanism 1 is locked to an external platform, and the bottom surface 111 is a horizontal plane after the locking. Moreover, the feeding angle α is an angle between the plane and the feeding surface 121.

In some embodiments, the flipping surface 112 includes at least one section, where the section may be a flat section or an arc section. In some embodiments, the flipping surface 112 includes a plurality of arc sections connected in sequence. In some embodiments, the flipping surface 112 includes a plurality of flat sections connected in sequence. In some embodiments, the flipping surface 112 includes flat sections and arc sections connected in any order. In some other embodiments, the flipping surface 112 is a single plane. In embodiments shown in FIG. 1 to FIG. 3, the flipping surface 112 includes a plumb section 112a and a flipping section 112b. The plumb section 112a is a flat section and the flipping section 112b is an arc section, as shown in FIG. 2.

Figure 8A:
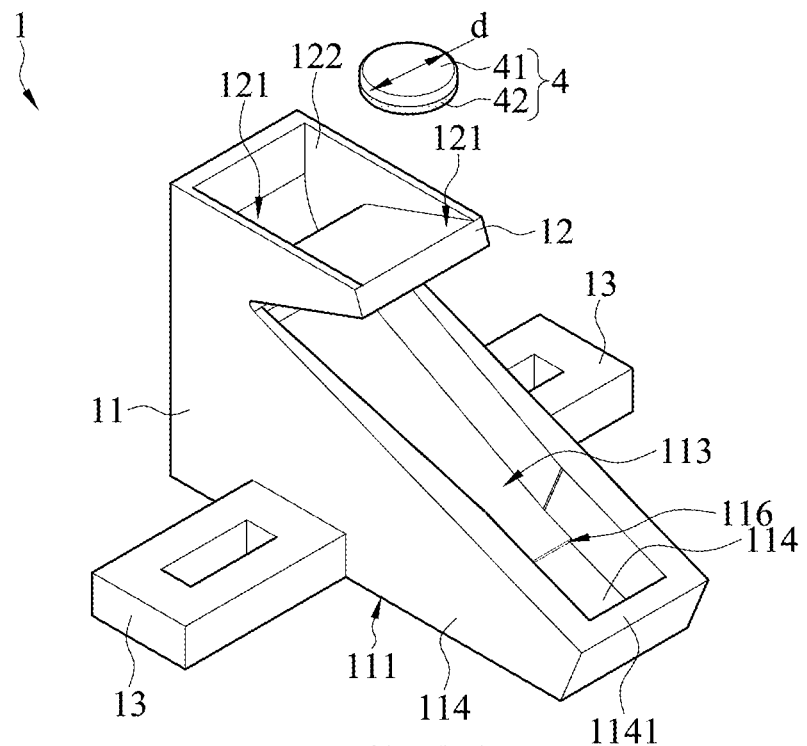
Figure 8B:
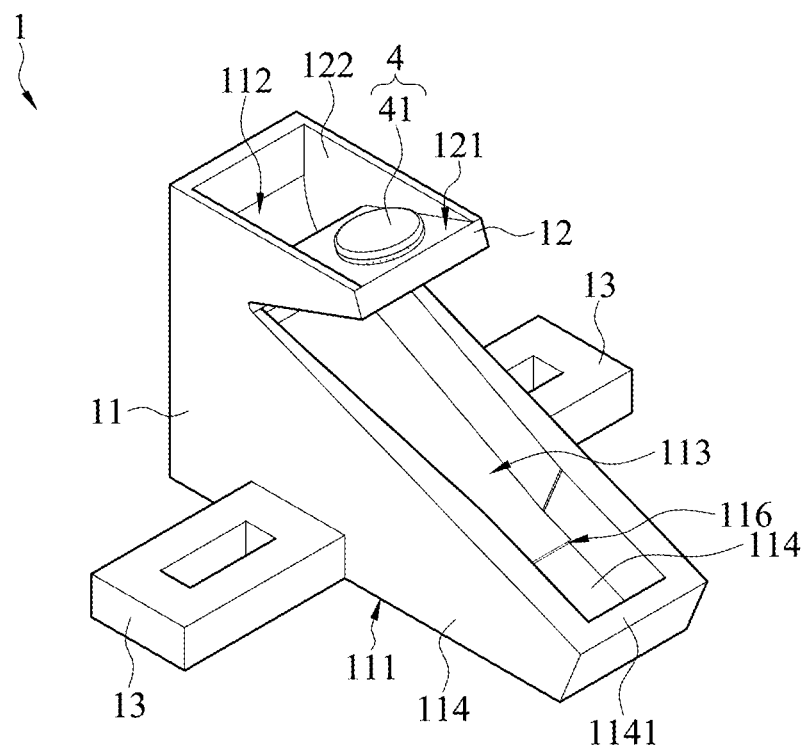
Figures 1, 8C:
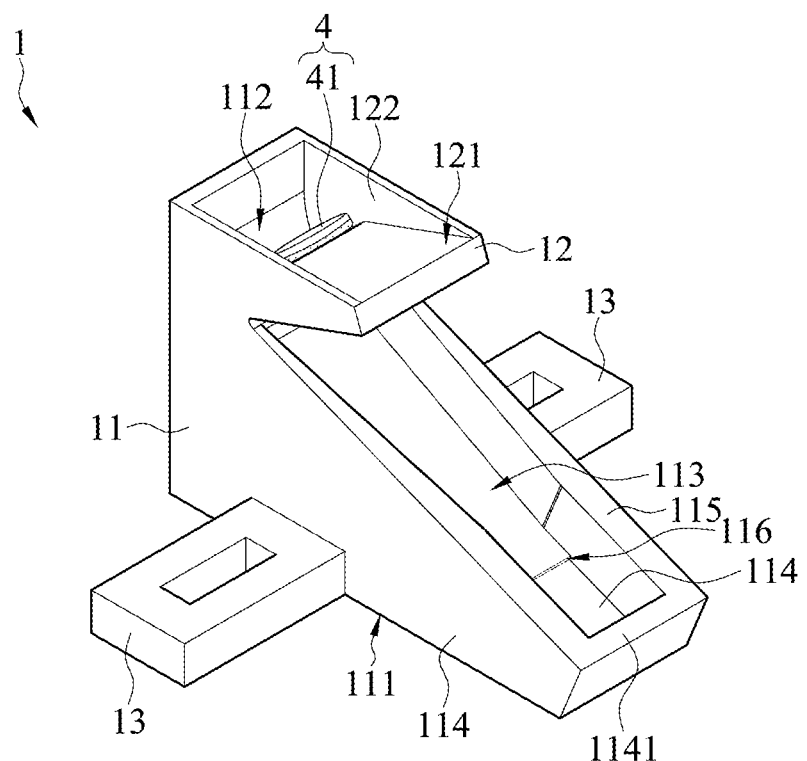
Figures 2, 8C:
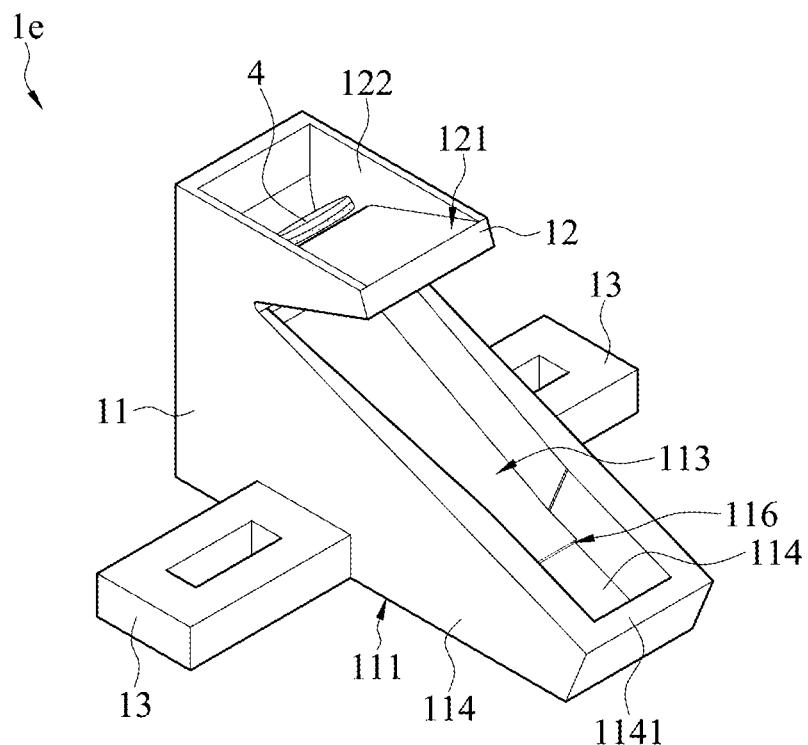
Figure 8D:
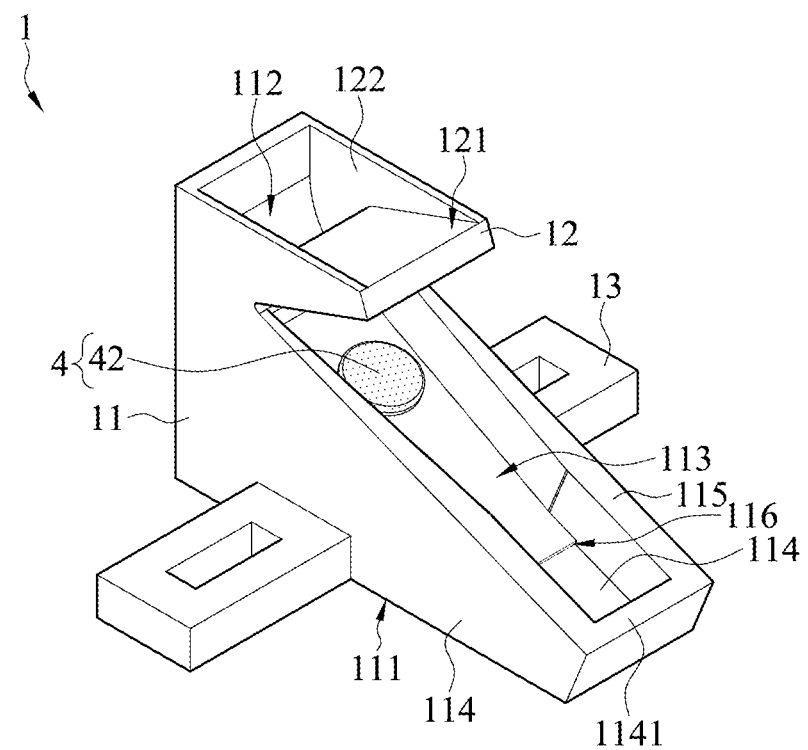
Figure 8E:
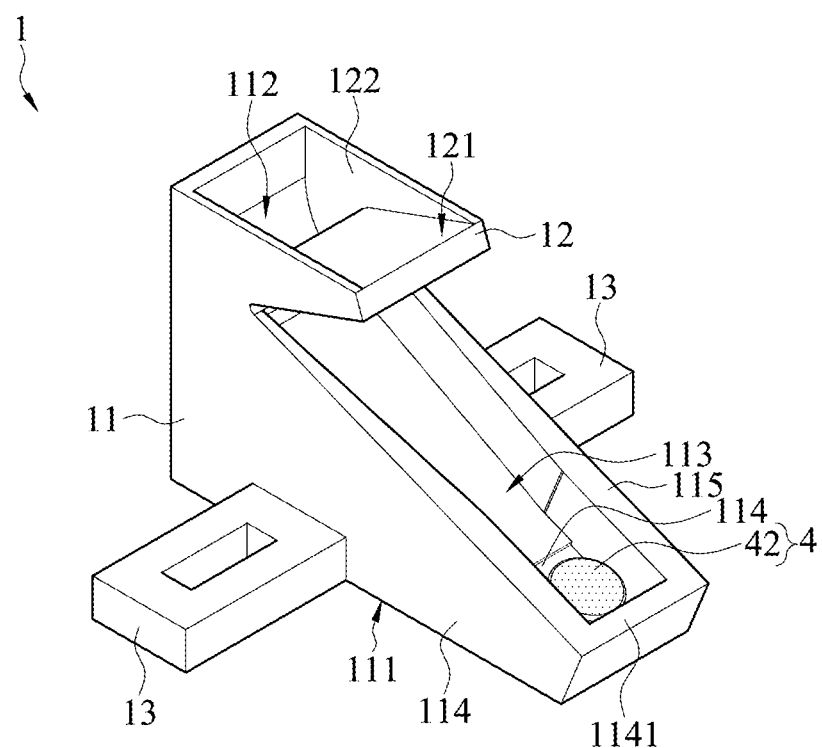

Referring to FIG. 2, the flipping surface 112 is a surface on which a workpiece slides along the feeding surface 121 and then collides and flips over (shown in FIG. 8B and FIG. 8C-1). The guiding element 12 is a static plane or curved surface. The feeding angle α is an angle between the imaginary line L1 extending from the feeding surface 121 toward the bottom surface 111 and an imaginary line L2 extending from the bottom surface 111. In some embodiments, the feeding angle α is equal to an angle between the feeding surface 121 and a plane at a top of the guiding element 12. The workpiece may be flat, but the disclosure is not limited thereto. In some embodiments, the workpiece is square. In some embodiments, the workpiece is in a strip form.

Figure 9A:
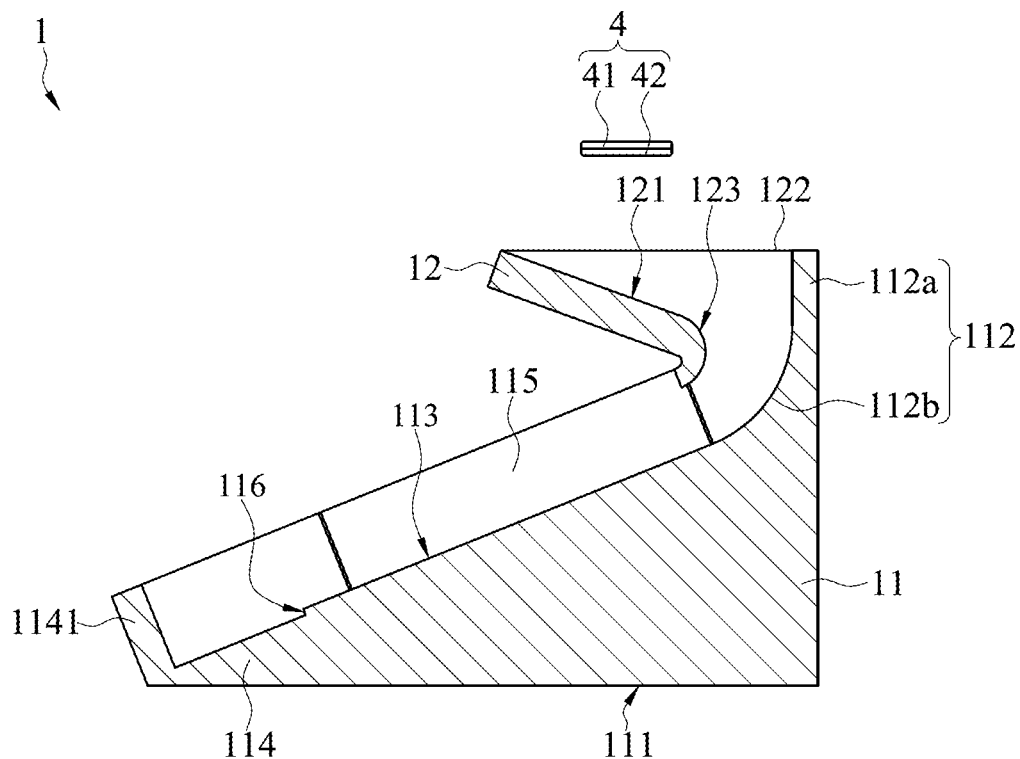
Figure 9B:
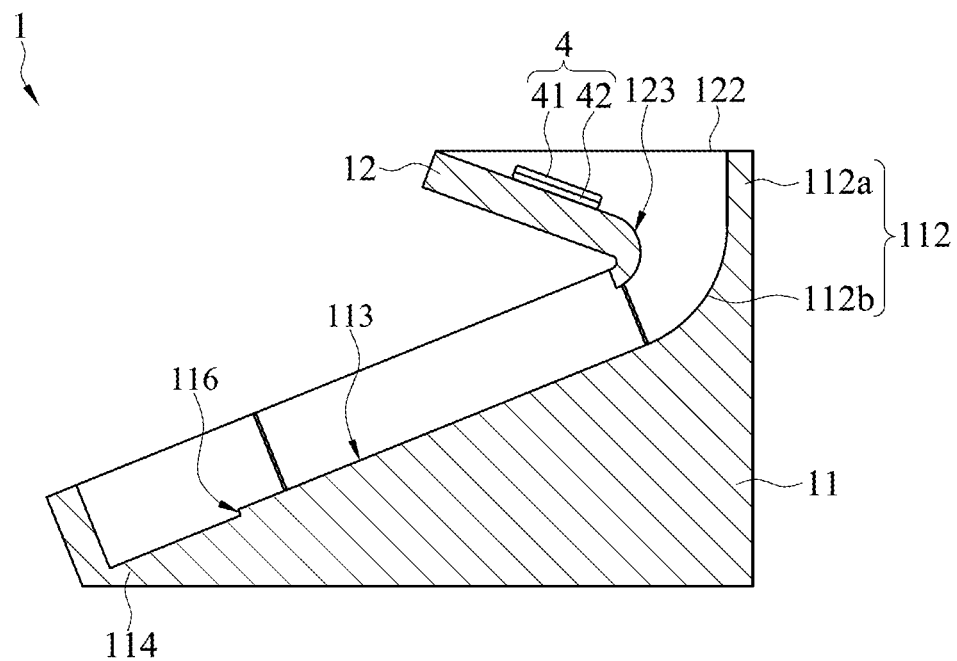

Referring sequentially to FIG. 8A to FIG. 8E and FIG. 9A to FIG. 9E, the drawings are respectively continuous state diagrams of for flipping over a workpiece in an embodiment in FIG. 1. FIG. 9A to FIG. 9E are cross-sectional views corresponding to FIG. 8A to FIG. 8E respectively at a position 2-2 in FIG. 1. To present a flipped state of a workpiece 4, for the workpiece 4 in the drawings, a first surface 41 and a second surface 42 opposite to each other are denoted respectively. FIG. 8A and FIG. 9A show that the workpiece 4 is located above the guiding element 12. The workpiece 4 may be moved by a mechanical arm (details are described below) to above the guiding element 12, then be released, and fall onto the feeding surface 121 of the guiding element 12 under the gravity of the workpiece 4, or the workpiece 4 is directly placed on the feeding surface 121 by the mechanical arm (as shown in FIG. 8B and FIG. 9B).

When the workpiece 4 is located on the feeding surface 121, because the bottom surface 111 of the flip-over mechanism 1 is located on a horizontal platform, and the feeding angle α between the feeding surface 121 and the bottom surface 111 is greater than or equal to 20 degrees and less than or equal to 60 degrees, the workpiece 4 slides toward the flipping surface 112 under the gravity thereof, where a sliding speed thereof is related to the weight of the workpiece 4, a friction coefficient between the workpiece 4 and the feeding surface 121, and the size of the feeding angle α (details are described below).

Figures 1, 9C:
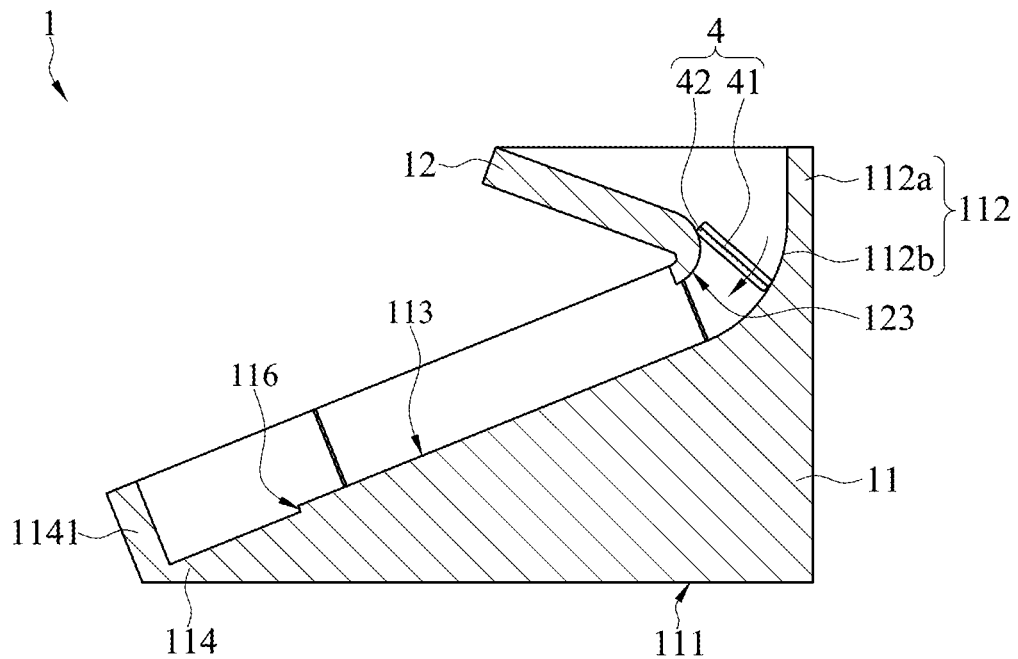
Figures 2, 9C:
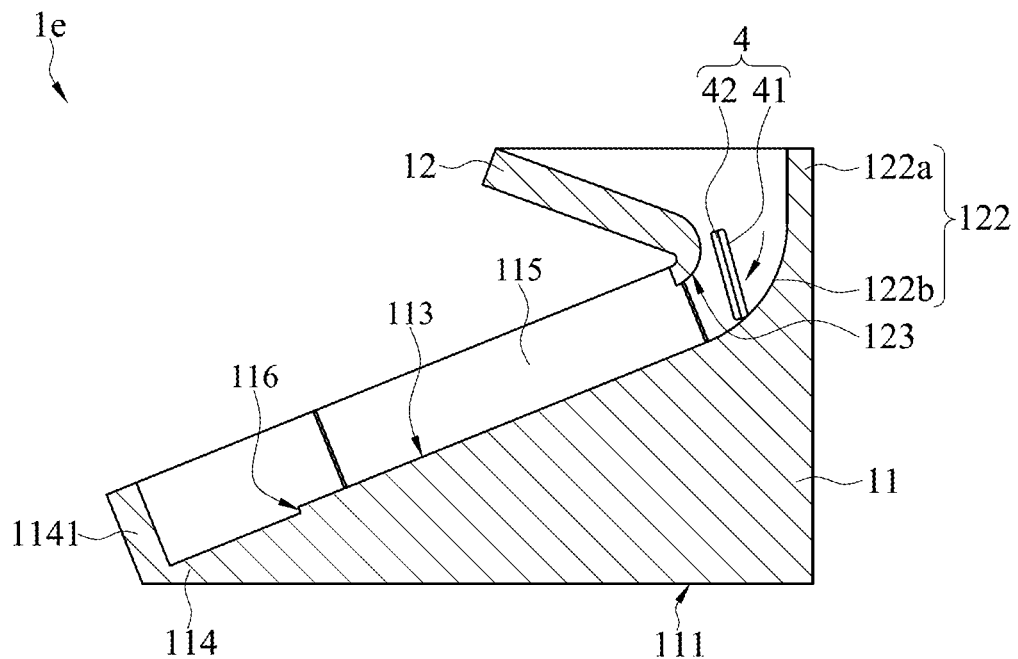
Figure 9D:
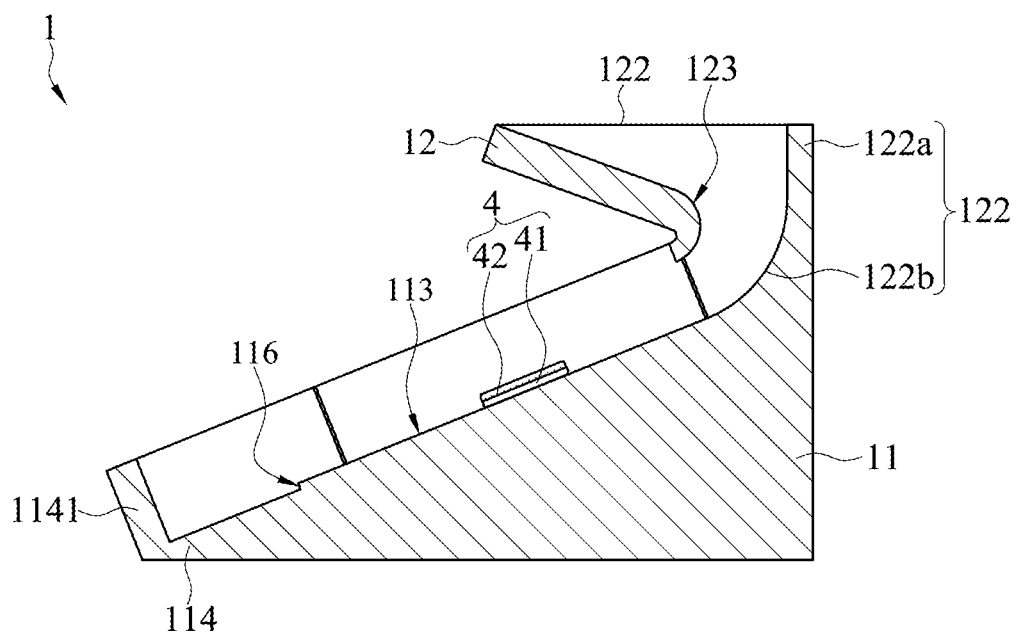
Figure 9E:
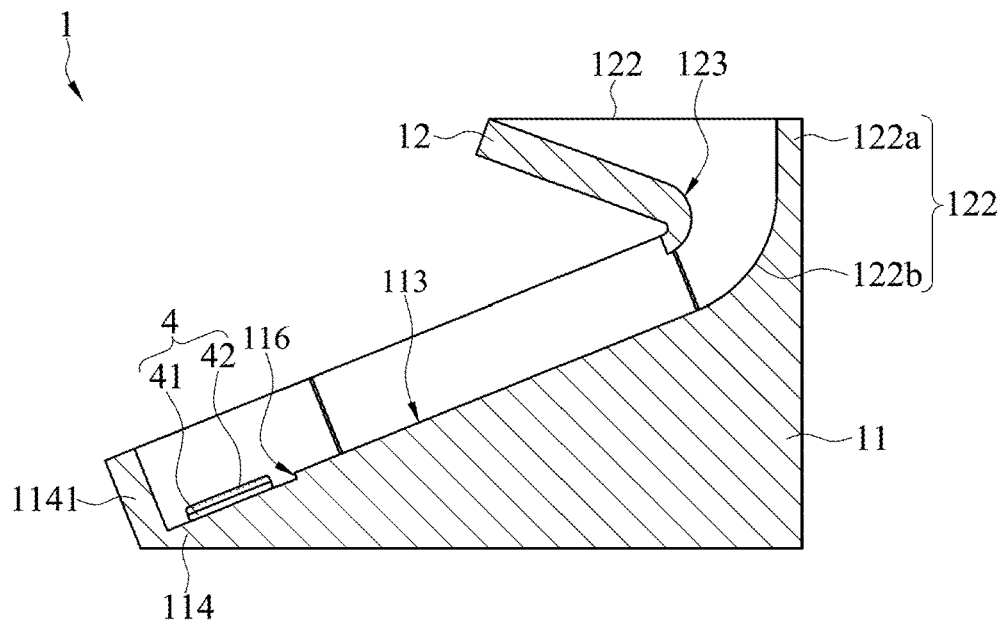

Next, the workpiece 4 slides to an end of the feeding surface 121 (that is, an end close to the flipping surface 112) and slides out of the feeding surface 121. When the workpiece 4 slides out of the feeding surface 121, the workpiece 4 comes into contact with the flipping surface 112, and the workpiece 4 is flipped over by means of a proper design of the flipping surface 112, so that the first surface 41 of the workpiece 4 comes into contact the flipping surface (as shown in FIG. 8C-1 and FIG. 9C-1). Referring to a flip-over mechanism 1 shown in FIG. 9C-1 and a flip-over mechanism 1e shown in FIG. 9C-2, FIG. 9C-1 and FIG. 9C-2 show cases at different sliding speeds when the workpiece 4 slides on the feeding surface 121, where the sliding speed of the workpiece 4 in FIG. 9C-1 is higher than that of the workpiece 4 in FIG. 9C-2. As mentioned above, the sliding speed of the workpiece 4 is related to the weight of the workpiece 4, the friction coefficient between the workpiece 4 and the feeding surface 121, and the size of the feeding angle α. If the weight of the workpiece 4 is lighter and the friction coefficient is smaller, or if the feeding angle α is larger, the sliding speed of the workpiece 4 is higher. If the sliding speed of the workpiece 4 is higher, a position at which the workpiece 4 comes into contact with the flipping surface 112 is higher (as shown in FIG. 9C-1). In this case, an arc angle of the flipping surface 112 needs to be adjusted correspondingly, to enable the workpiece 4 to be flipped over homeopathically by means of a moment of inertia generated by the sliding speed thereof a clockwise flip-over from an angle of view of FIG. 8C-2). In this way, the flip-over mechanism 1 may flip over a workpiece 4 by using the gravity of the workpiece 4 rather than using any other power mechanism, thereby saving maintenance costs.

Referring to FIG. 2, in some embodiments, the guiding element 12 includes a feeding arc-surface 123. The feeding arc-surface 123 is connected to an end of the feeding surface 121 facing the flipping surface 112. The feeding arc-surface 123 is adapted to enable the workpiece 4 flip over better, or ensure that the workpiece 4 can flip over correctly. For example, if the sliding speed of the workpiece 4 is low (as shown in FIG. 9C-2), the workpiece 4 rotates along a curved surface of the feeding arc-surface 123 when the center of gravity of the workpiece 4 moves out of the feeding surface 121. The workpiece 4 falls and comes into contact with the flipping surface 112 due to the gravity thereof if the center of gravity of the workpiece 4 exceeds a plumb tangent plane (that is, the right-most point of the feeding arc-surface 123 in the view of FIG. 9C-2) of the curved surface of the feeding arc-surface 123. In addition, referring to FIG. 9C-1 and FIG. 9C-2, if the sliding speed of the workpiece 4 is relatively high (as shown in FIG. 9C-1), and the center of gravity of the workpiece 4 exceeds the plumb tangent plane of the curved surface of the feeding arc-surface 123, the workpiece 4 falls and comes into contact with the flipping surface 112 due to its speed and gravity. In this case, a position at which the workpiece 4 comes into contact with the flipping surface 112 is higher than a contact position shown in FIG. 9C-2. In some embodiments, a flipping radius R1 of the flipping surface 112 is larger than a feeding radius R2 of the feeding arc-surface 123. In some embodiments, the center position of the feeding radius R2 is different from the center position of the flipping radius R1. In some embodiments, the flipping radius R1 of the flipping surface 112 is larger than the feeding radius R2 of the feeding arc-surface 123 by 10 mm. In some embodiments, the flipping radius R1 is 20 mm, and the feeding radius R2 is 6 mm.

Figure 4:
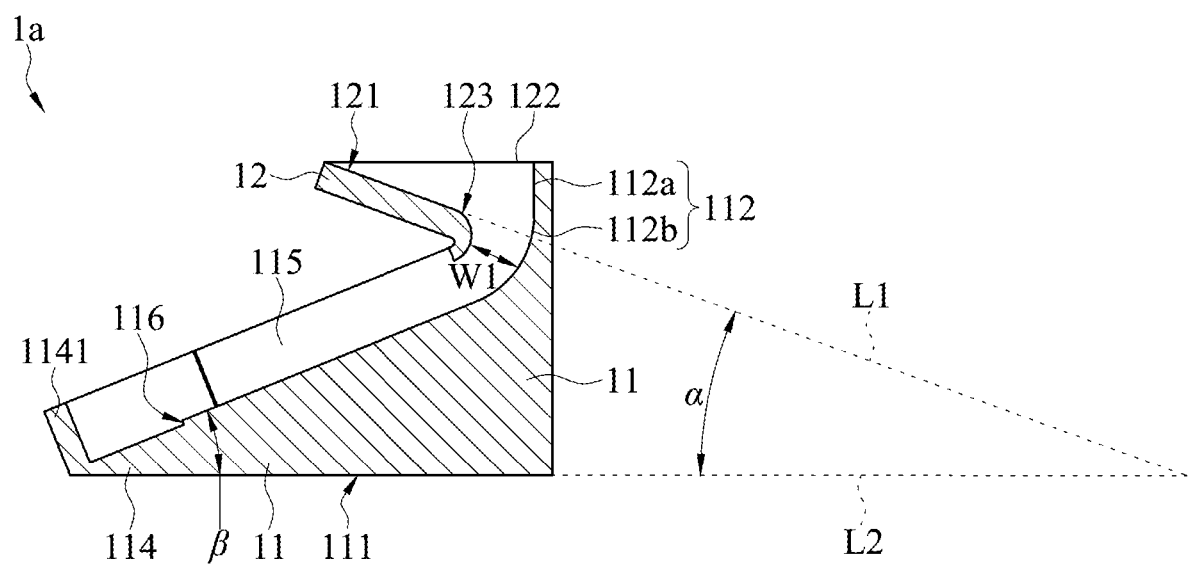
FIG. 4 is a cross-sectional view of a flip-over mechanism according to some embodiments.
Figure 5:
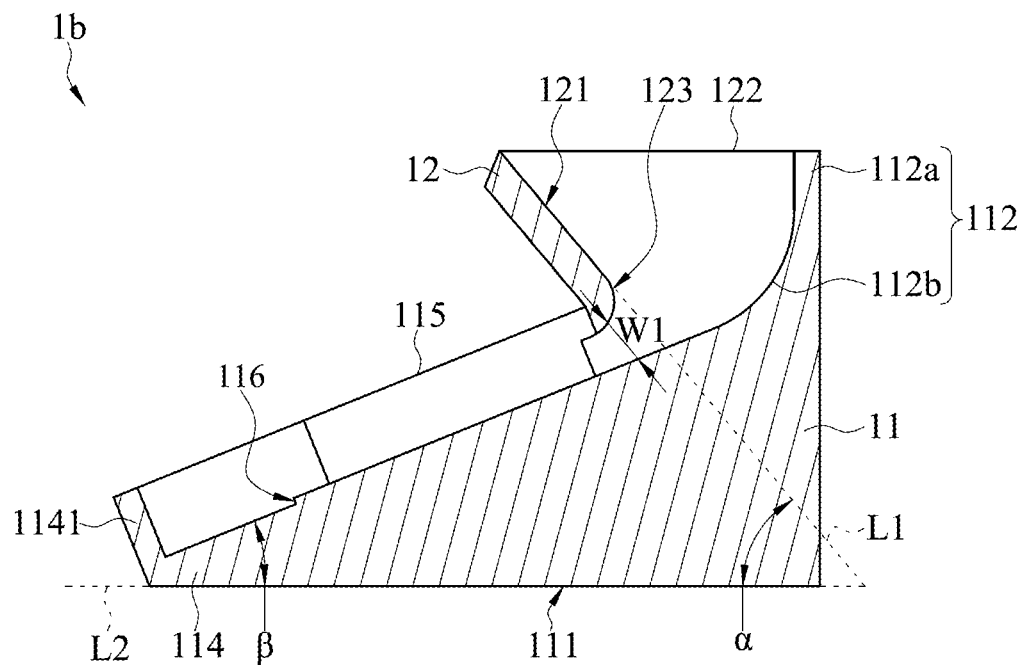
FIG. 5 is a cross-sectional view of a flip-over mechanism according to some embodiments.
Figure 6:
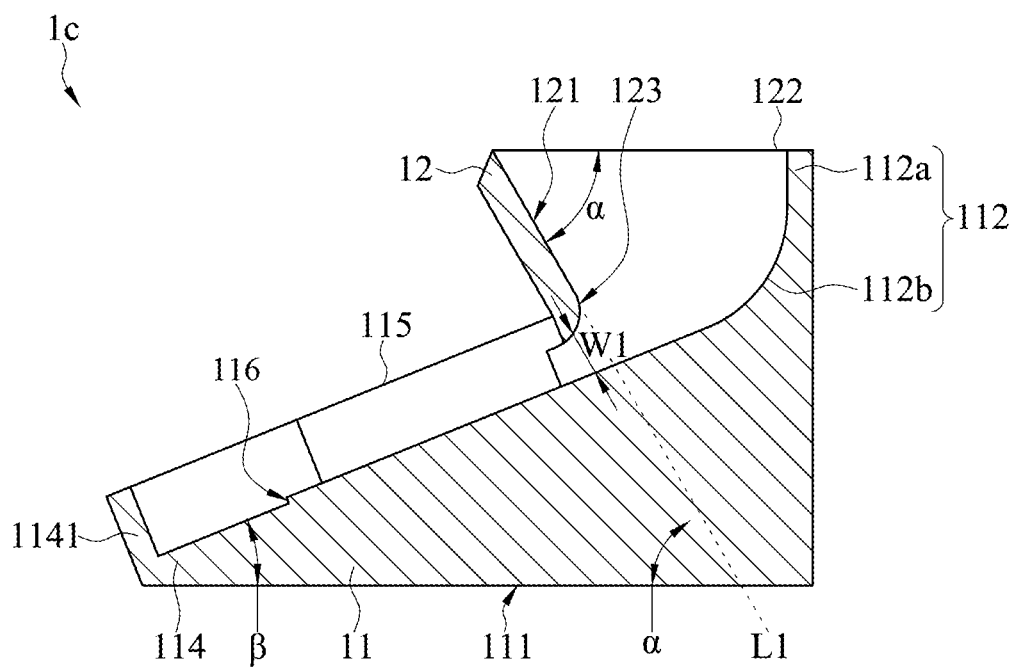
FIG. 6 is a cross-sectional view of a flip-over mechanism according to some embodiments.

FIG. 4 to FIG. 6 are cross-sectional views of the flip-over mechanism according to some embodiments. FIG. 4 to FIG. 6 show flip-over mechanisms with different feeding angles α, and a flip-over mechanism 1a shown in FIG. 4 has a feeding angle α of 30 degrees. A feeding angle α of a flip-over mechanism 1b shown in FIG. 5 is 50 degrees. A feeding angle α of a flip-over mechanism 1c shown in FIG. 6 is 60 degrees. As described above, the magnitude of the feeding angles α affects the sliding speed at which the workpiece 4 slides along the feeding surface 121, a position at which the workpiece 4 collides with the flipping surface 112, and a trajectory of the flipping of the workpiece 4. However, the disclosure is not limited thereto. A user may select a flip-over mechanism 1 with a different feeding angle α.

Figure 7:
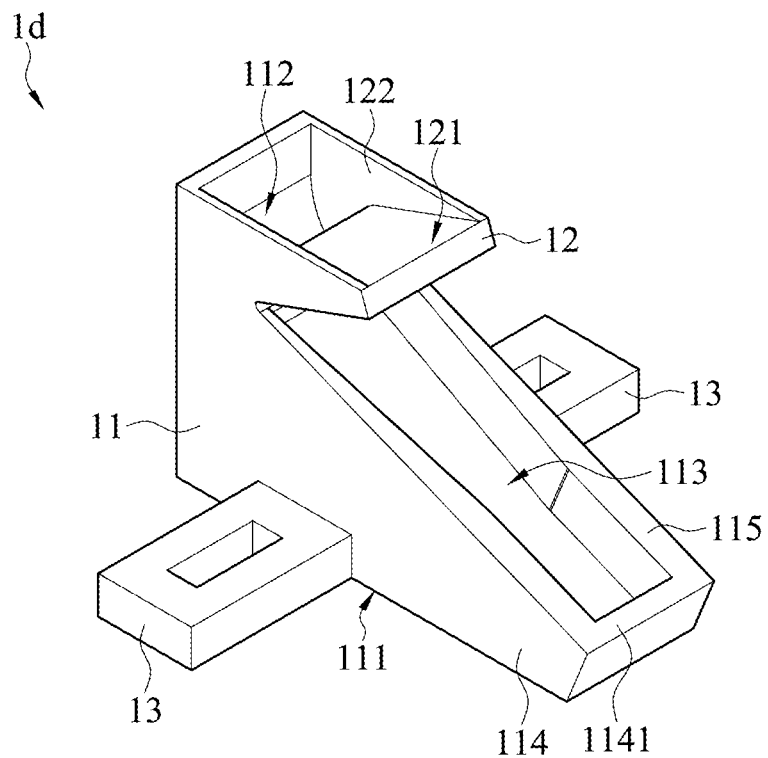
FIG. 7 is a three-dimensional view of a flip-over mechanism according to some embodiments.

Referring to FIG. 1 to FIG. 3 again and FIG. 7, FIG. 7 is a three-dimensional view of a flip-over mechanism 1d according to some embodiments. In some embodiments, the base 11 further includes a discharging surface 113 and a blanking seat 114. In some embodiments, the discharging surface 113 and the blanking seat 114 are integral, as shown in FIG. 1. The discharging surface 113 is connected to the flipping surface 112, and referring to FIG. 8D and FIG. 9D, the workpiece 4 that has been flipped over slides along the discharging surface 113 after being moved out of the flipping surface 112. In some embodiments, the blanking seat 114 is connected to the discharging surface 113, so that the workpiece 4 that has been flipped over enters the blanking seat 114 after being moved out of the discharging surface 113. In some embodiments, the blanking seat 114 includes a blocking wall 1141. When the workpiece 4 is moved to the blanking seat 114, the blocking wall 1141 is adapted to block the workpiece 4 that slides. In some embodiments, there is no height difference between the discharging surface 113 and the blanking seat 114, that is, a wall surface of the blanking seat 114 for placing a workpiece 4 that has been flipped over is smoothly connected to the discharging surface 113, as shown in FIG. 7. In some embodiments, the blanking seat 114 is lower than the discharging surface 113, and there is a step 116 between the blanking seat 114 and the discharging surface 113, as shown in FIG. 1. In this way, when the workpiece 4 is moved to the blanking seat 114 and is blocked and rebounded by the blocking wall 1141, the workpiece 4 remains in the blanking seat 114 due to the step 116. With the above features, the workpiece 4 that has been flipped over can be located at a predetermined position for use in subsequent manufacturing processes (details are described below). In some embodiments, the discharging surface 113 and the blanking seat 114 are two separable components, there is a docking structure between the discharging surface 113 and the blanking seat 114, and the docking structure may have a corresponding shape. The docking structure in the corresponding shape may include an adhesive used to a position between the discharging surface 113 and the blanking seat 114, so that the workpiece 4 that has been flipped over smoothly slides into the blanking seat 114. In some embodiments, referring to FIG. 7, the flip-over mechanism 1d includes the discharging surface 113 and the blocking wall 1141. The workpiece 4 is blocked by the blocking wall 1141 after sliding out of the discharging surface 113. In some embodiments, as shown in FIG. 2, there is an angle β between the discharging surface 113 and the bottom surface 111. The magnitude of the angle β affects a speed at which the workpiece 4 that has been flipped over slides along the discharging surface 113. A smaller angle β indicates a lower speed at which the workpiece 4 that has been flipped over slides on the discharging surface 113. In some embodiments, the angle β is about 22 degrees, but the disclosure is not limited thereto.

Referring to FIG. 1 and FIG. 3, in some embodiments, the guiding element 12 includes two side walls 122, where the two side walls 122 are located on opposite sides of the feeding surface 121. The two side walls 122 can prevent the workpiece 4 from falling out of the guiding element 12 by limiting the range of movement of the workpiece 4 that is not flipped over along the feeding surface 121. In some embodiments, the base 11 includes two guiding walls 115. The guiding walls 115 are connected to the flipping surface 112 and located on opposite sides of the discharging surface 113 and opposite sides of the blanking seat 114. The two guiding walls 115 can limit a range in which the workpiece 4 that has been flipped over slides along the discharging surface 113 after the workpiece 4 that has been flipped over is moved out of the flipping surface 112, to enable the workpiece 4 that has been flipped over to smoothly slide to the blanking seat 114. In some embodiments, a spacing W4 between the two guiding walls 115 on the blanking seat 114 is equal to a spacing W3 between the two guiding walls 115 on the discharging surface 113. However, the disclosure is not limited thereto. In some embodiments, the spacing W3 between the two guiding walls 115 tapers from the flipping surface 112 to the blanking seat 114. The "taper" may be partial or full tapering. In an embodiment shown in FIG. 3, the spacing W3 between the two guiding walls 115 partially tapers. The spacing W3 between the two guiding walls 115 tapers from the flipping surface 112 to the blanking seat 114, so that a range in which the workpiece 4 that has been flipped over tapers, to smoothly guide the workpiece 4 that has been flipped over to move to the blanking seat 114. The tapering of the spacing between the guiding walls 115 has the functions of reducing a sliding speed of the workpiece 4 that has been flipped over, and locating the workpiece 4 that has been flipped over. In an embodiment shown in FIG. 3, the spacing W4 between the two guiding walls 115 on the blanking seat 114 is smaller than the spacing W3 between the two guiding walls 115 on the discharging surface 113.

According to some embodiments, a user designs a flip-over spacing W1, a spacing W2 between the two side walls 122, and a spacing W3 between the two guiding walls 115 into different sizes according to the shape and size of a workpiece to be flipped over (for example, an outer diameter and thickness of the workpiece), so that the workpiece can smoothly move along the feeding surface 121, be flipped over within the flip-over spacing W1, and be moved out along the discharging surface 113 to fall onto the blanking seat 114. In some embodiments, a user designs sizes of the flip-over spacing W1, the spacing W2 between the two side walls 122, and the spacing W3 between the two guiding walls 115 according to the outer diameter of a workpiece. In some embodiments, a user designs sizes of the flip-over spacing W1, the spacing W2 between the two side walls 122 and the spacing W3 between the two guiding walls 115 according to the thickness of a workpiece, which is not limited in the present invention. In some embodiments, the spacing W2 between the two side walls 122 is larger than the flip-over spacing W1. In some embodiments, the spacing W2 between the two side walls 122 is equal to the flip-over spacing W1. In some embodiments, the flip-over spacing W1 is substantially the same as the spacing W2 between the two side walls 122 and the spacing W3 between the two guiding walls 115.

As shown in FIG. 1 to FIG. 3, in the embodiments, the spacing W2 between the two side walls 122 is designed to be greater than the outer diameter d of the workpiece 4 (as shown in FIG. 8A), the spacing W3 between the two guiding walls 115 on the discharging surface 113 is designed to be greater than the outer diameter d of the workpiece 4, and the spacing W4 between the two guiding walls 115 on the blanking seat 114 is substantially equal to the outer diameter d of the workpiece 4. In this way, the workpiece 4 can smoothly move along the feeding surface 121 and move out along the discharging surface 113 after being flipped over. The workpiece 4 moves at a gradually reduced speed and is located on the blanking seat 114 due to the spacing W3 and the spacing W4 between the two guiding walls 115. In some embodiments, the spacing W2 between the two side walls 122 is 30 mm, and the spacing W4 between the two guiding walls 115 on the blanking seat 114 is 20.5 mm. The workpiece 4 is a battery with a weight of 3.2 g and an outer diameter d' of 20 mm (as shown in FIG. 11).

Figure 10:
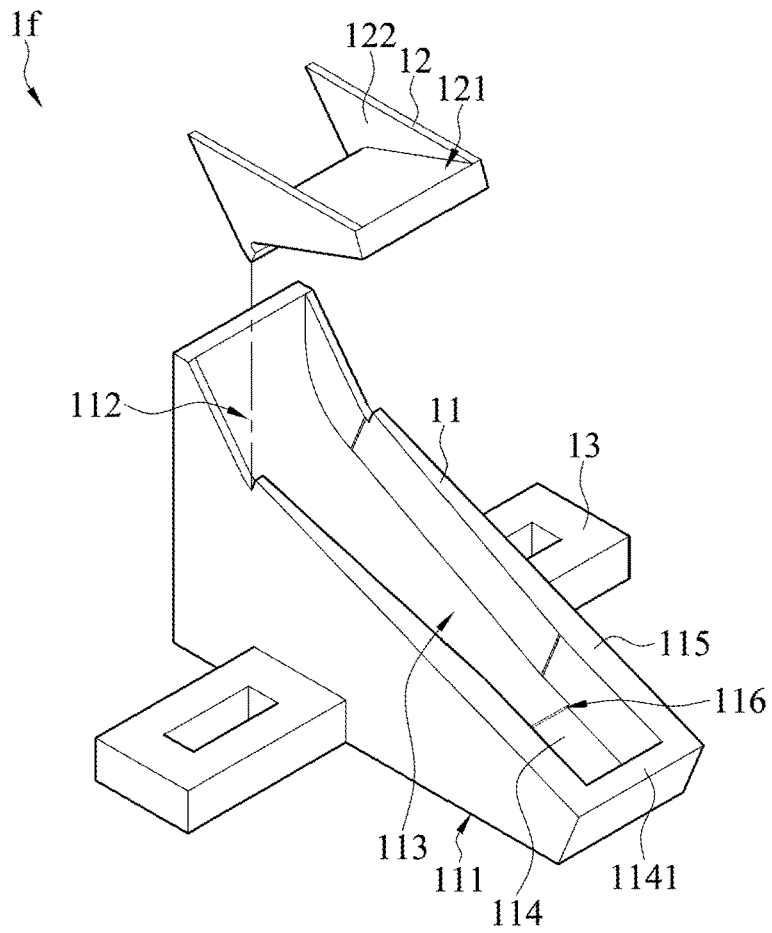
FIG. 10 is a schematic exploded view of a flip-over mechanism according to some embodiments.

FIG. 10 is a schematic exploded view of a flip-over mechanism if according to some embodiments. In the embodiment shown in FIG. 1, the base 11 and the guiding element 12 are an integrally formed structure, but the base 11 and the guiding element 12 of embodiments shown in FIG. 10 are in two pieces. There is a docking structure between the base 11 and the guiding element 12, and the docking structure may be in a corresponding shape (as shown in FIG. 10), or be a docking structure with a buckle function. In addition, the docking structure in the corresponding shape may further include an adhesive used to fix a relative position between the base 11 and the guiding element 12, so that the flip-over mechanism 1 can flip over a workpiece 4 smoothly. In addition, in some embodiments, the flip-over mechanism 1 further includes two fixing elements 13 respectively located on two sides of the base 11. The fixing elements 13 help to fix the flip-over mechanism 1 to a production machine or to a bottom surface.

In addition, in some embodiments, the material of the flip-over mechanism 1 may be, but is not limited to, an acrylonitrile-butadiene-styrene copolymer (ABS resin), phenolic resin (bakelite), plexiglass, wood, or cast iron.

Figure 11:
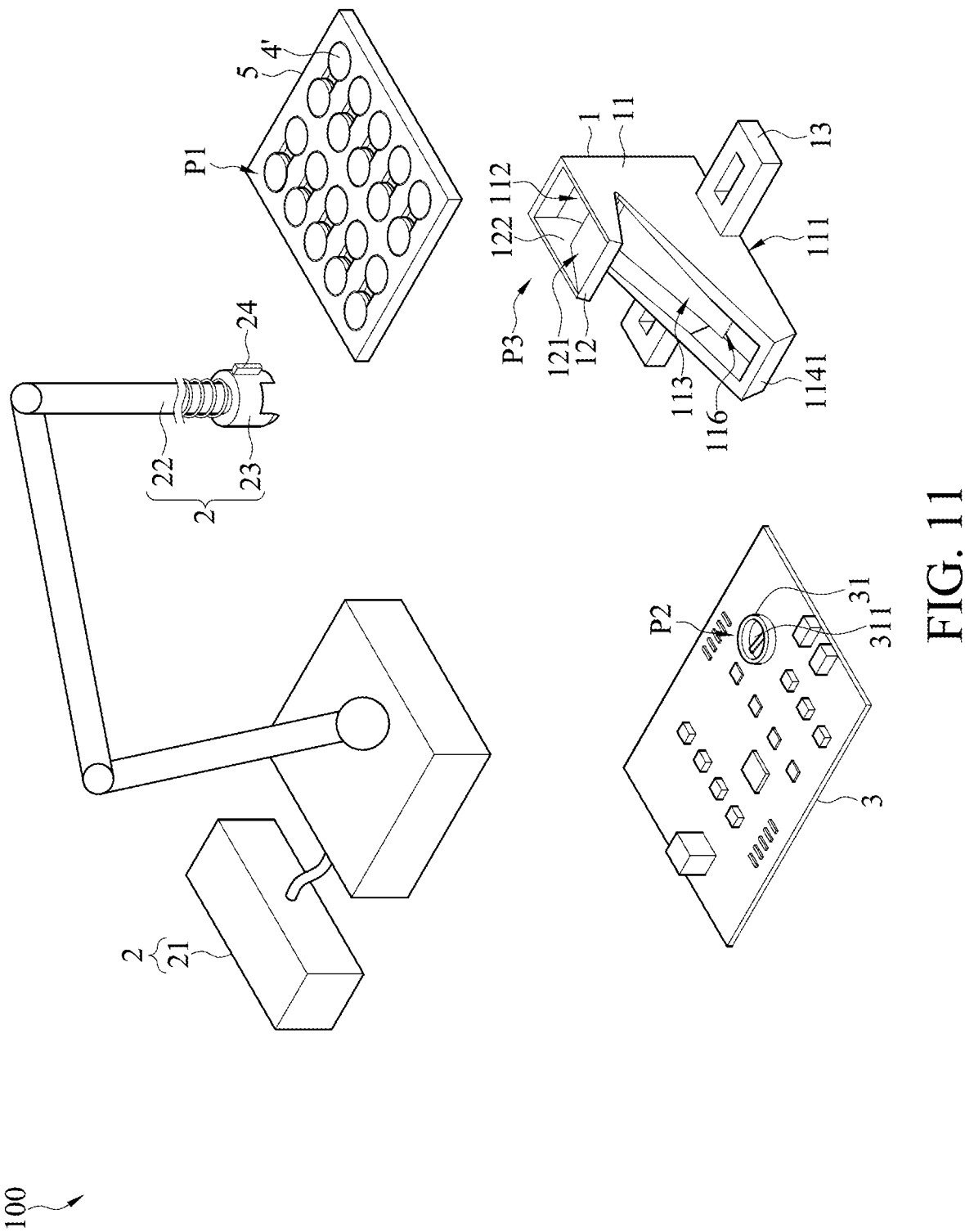
FIG. 11 is a three-dimensional view of a flip-over system according to some embodiments.

FIG. 11 is a three-dimensional view of a flip-over system 100 according to some embodiments. The flip-over system 100 includes a flip-over mechanism 1 and a mechanical arm 2. The mechanical arm 2 includes a controller 21, a movable structure 22, and a picking head 23, where the movable structure 22 is connected to the picking head 23, and the controller 21 is configured to: actuate the movable structure 22 to move the picking head 23 to a first position P1 for the picking head 23 to perform a picking action; actuate the movable structure 22 to move the picking head 23 to a position above the feeding surface 121 for the picking head 23 to perform a release action; actuate the movable structure 22 to move the picking head 23 to a blanking seat 114 for the picking head 23 to perform the picking action; and actuate the movable structure 22 to move the picking head 23 to a second position P2 for the picking head 23 to perform the release action.

Figure 12A:
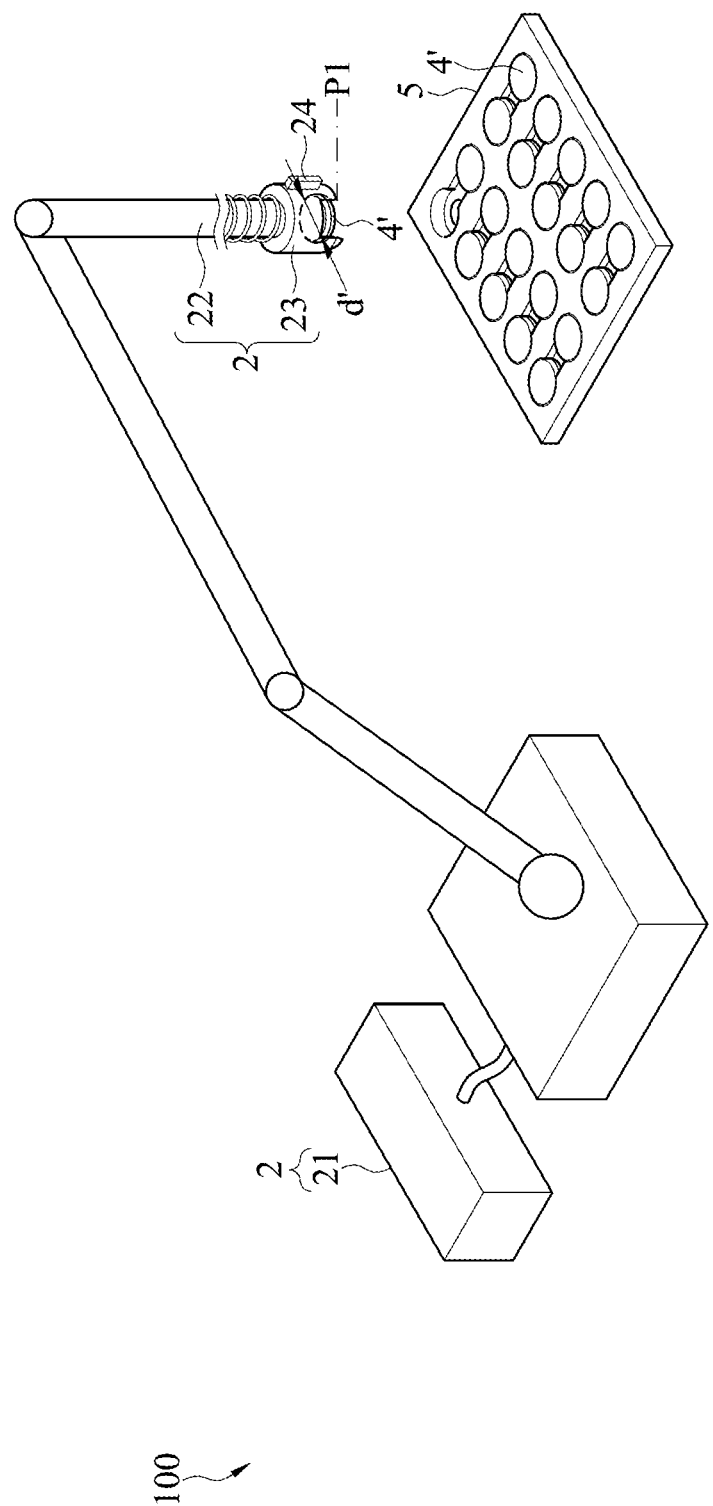
FIG. 12A, FIG. 12B, FIG. 12C, FIG. 12D, FIG. 12E, FIG. 12F and FIG. 12G show operating states of an embodiment of FIG. 11.

FIG. 12A to FIG. 12F show operating states of an embodiment in FIG. 11. The controller 21 actuates the movable structure 22 to move the picking head 23 to a first position P1, and then, the picking head 23 performs a picking action. The movable structure 22 includes a movable joint or a movable platform and moves the picking head 23 to a target position, that is, the first position P1. Next, the picking head 23 performs a picking action to pick up a workpiece 4. In some embodiments, the picking head 23 is a vacuum suction head. When the picking head 23 is actuated by the controller 21, the picking head 23 picks up a workpiece 4 in a vacuum suction manner, as shown in FIG. 12A. In some embodiments, the picking head 23 is a clamping jaw. When the clamping jaw is actuated by the controller 21, the clamping jaw clamps a workpiece 4. In embodiments of FIG. 11, the workpiece 4 is a battery 4'. The battery 4' includes a first surface 41 and a second surface 42. The first position P1 is above a battery 4' in a battery tray 5 or a place in which the picking head 23 can easily pick up the battery 4' after being fine-tuned by the controller 21. After being moved to the first position P1, the picking head 23 performs a picking action to pick up the battery 4'.

Figure 12B:
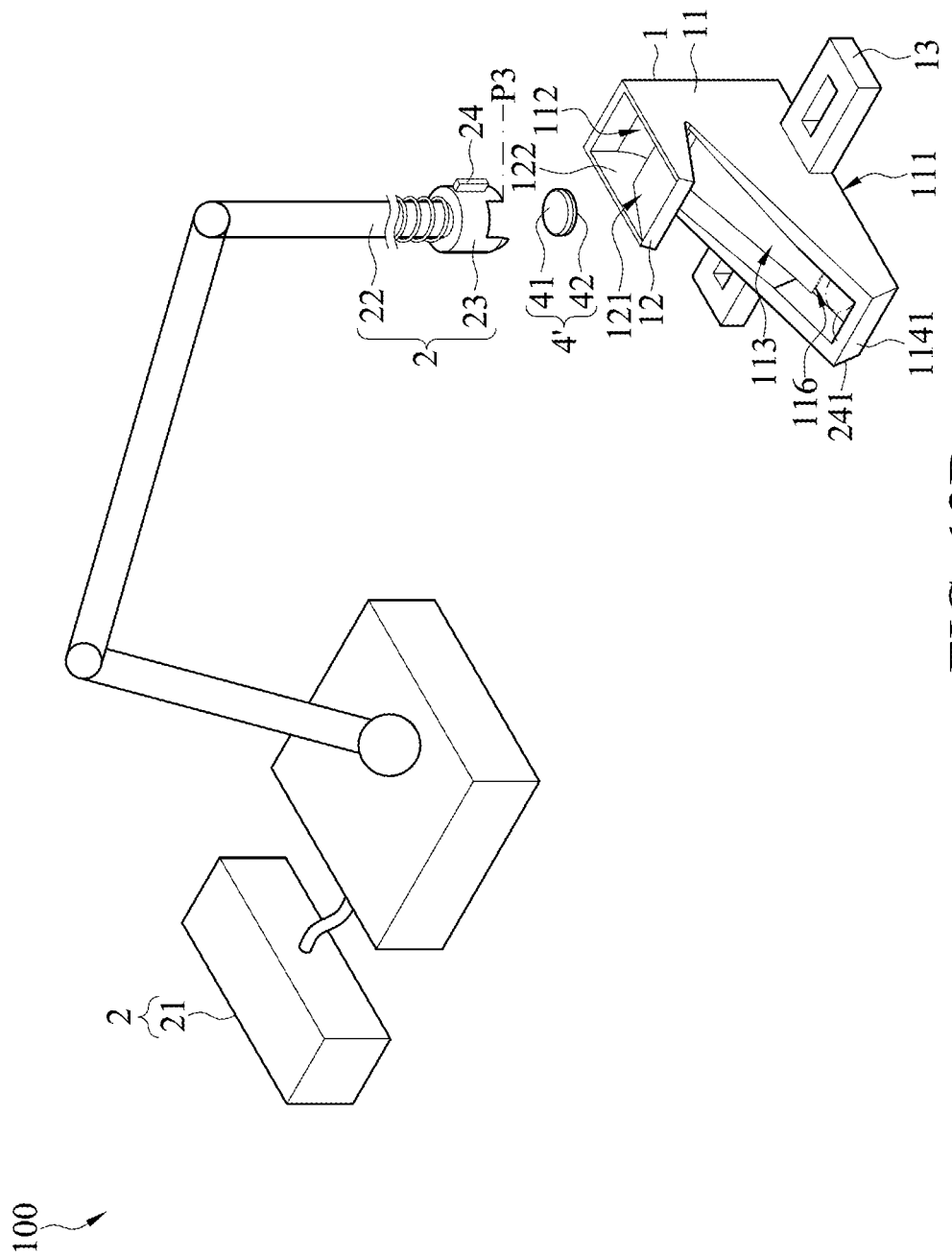

Next, the controller 21 actuates the movable structure 22 to move the picking head 23 to a position above the feeding surface 121 of the flip-over mechanism 1 (that is, a position P3), and causes the picking head 23 to perform a release action to release the battery 4', as shown in FIG. 12B.

Figure 12C:
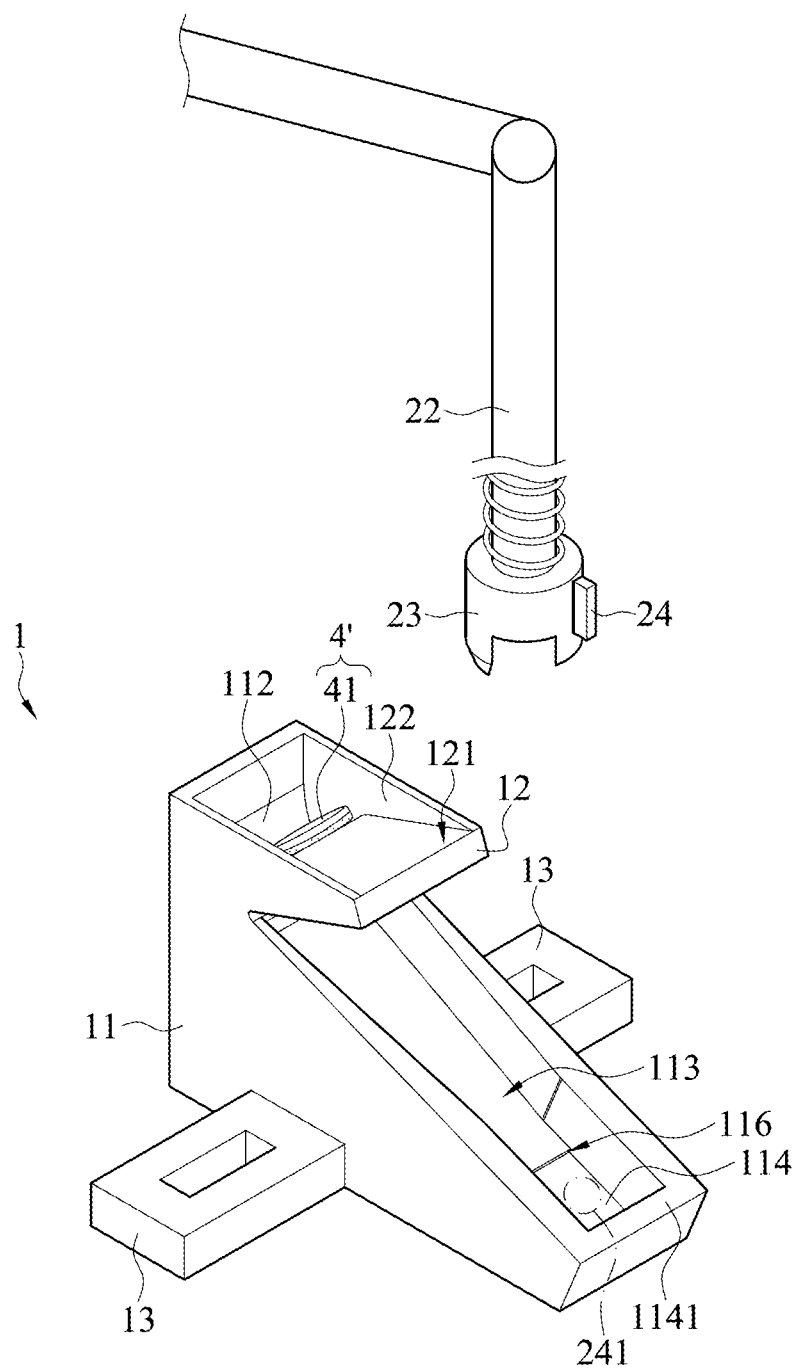
Figure 12D:
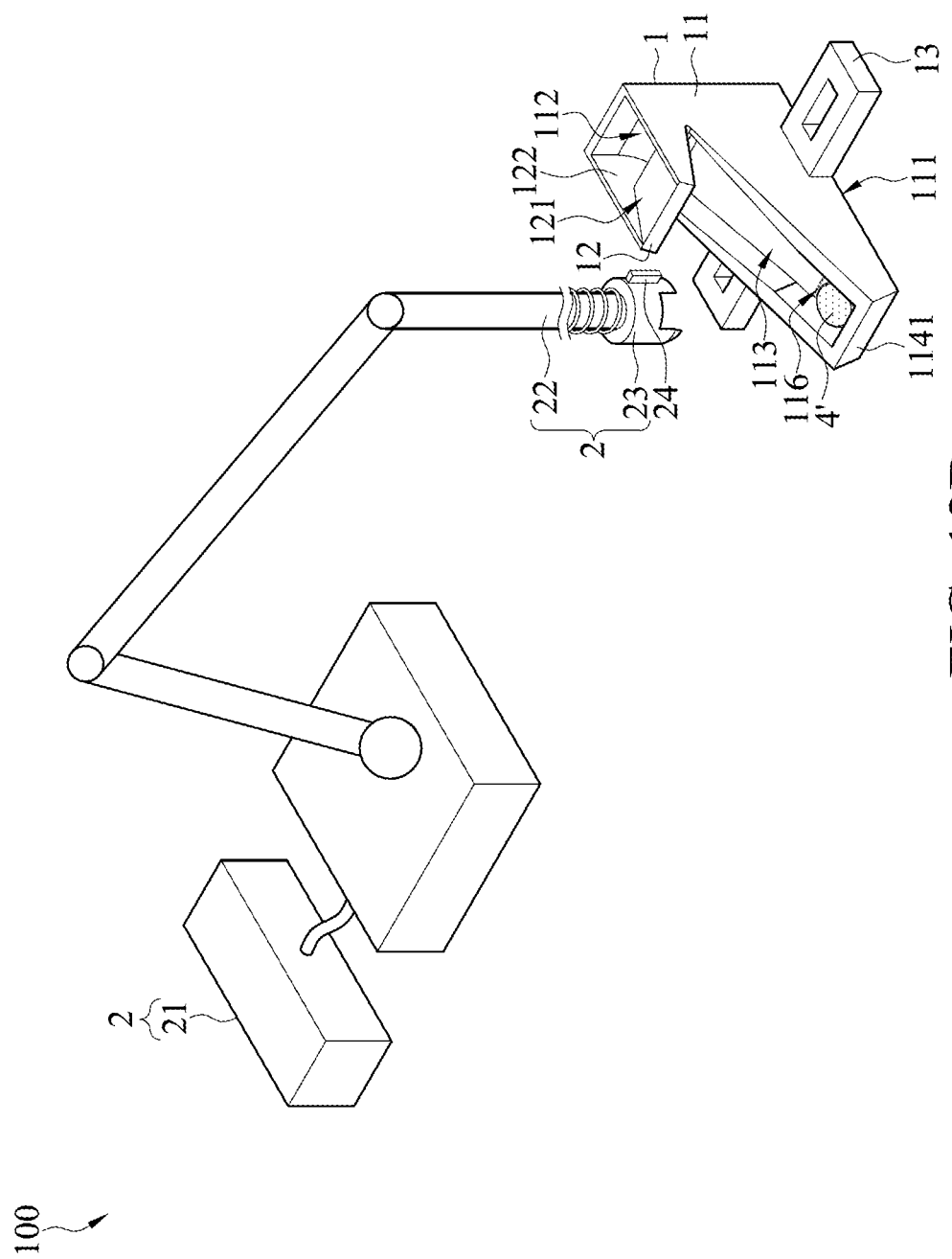

When the battery 4' is located on the feeding surface 121, due to an inclined state of the feeding surface 121 and the gravity of the battery 4', the battery 4' slides along the feeding surface 121, and flips by 180 degrees after touching the flipping surface 112, as shown in FIG. 12C. Subsequently, the battery 4' is moved out of the flipping surface 112 and slides along the discharging surface 113 to the blanking seat 114. The battery 4' has flipped by 180 degrees, and an upper surface is turned from the first surface 41 to the second surface 42, as shown in FIG. 12D.

Figure 12E:
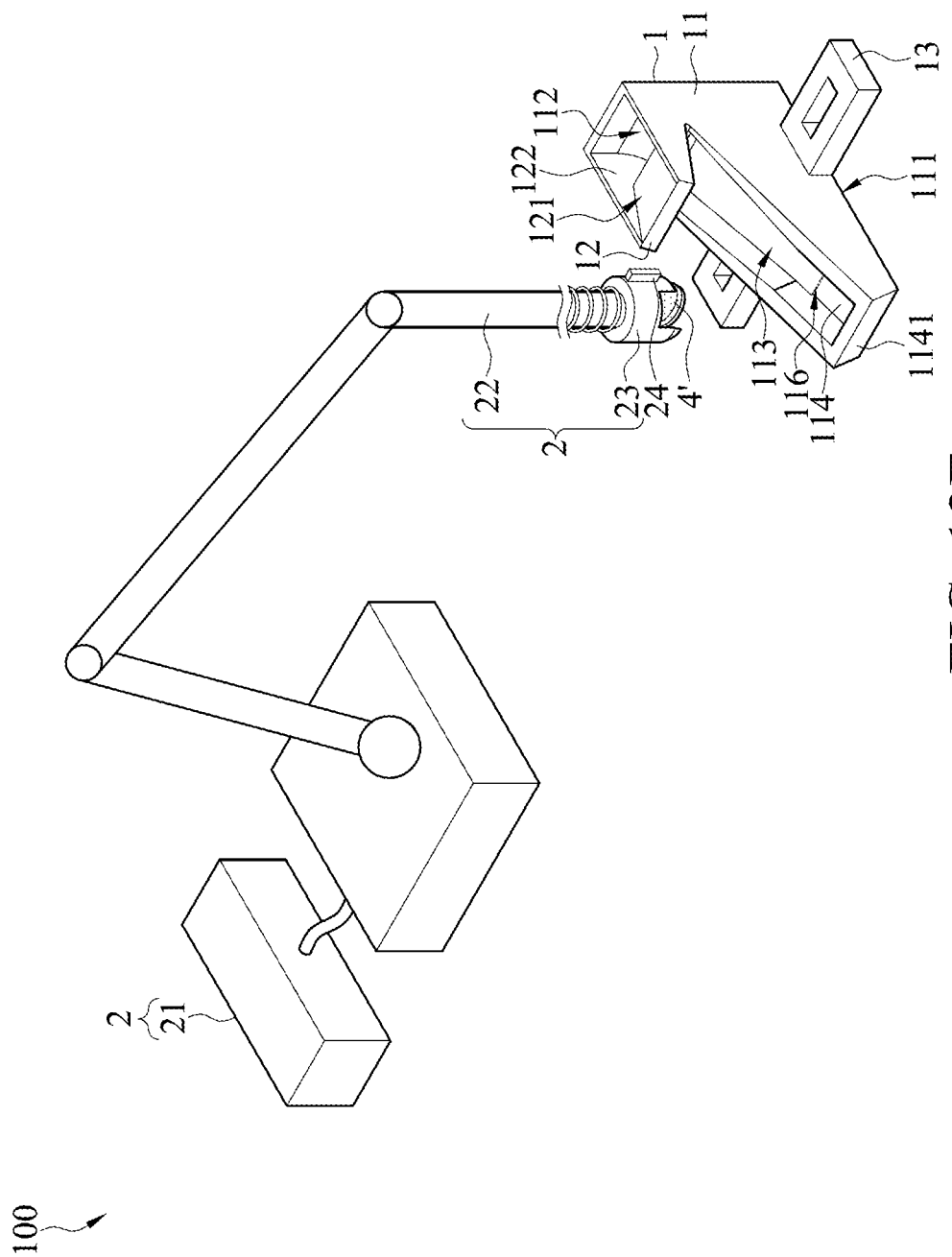

Next, the controller 21 actuates the movable structure 22 to move the picking head 23 to a blanking seat 114 and causes the picking head 23 to perform a picking action to suck, in a vacuum suction manner, the battery 4' that has been flipped over, as shown in FIG. 12E.

Figure 12F:
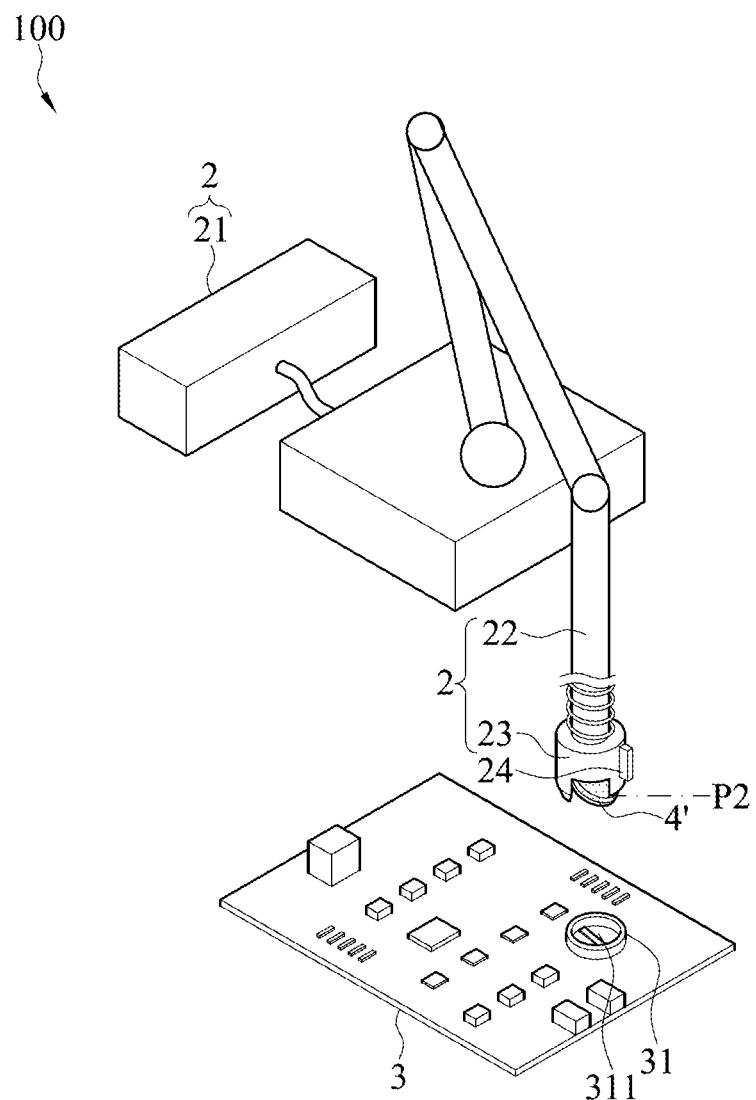
Figure 12G:
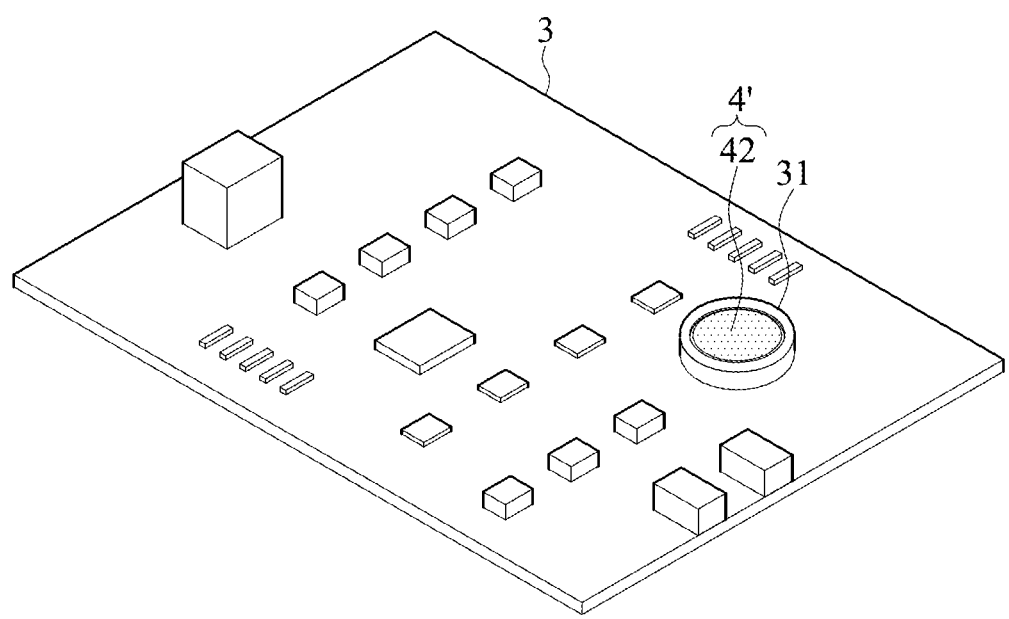

The controller 21 actuates the movable structure 22 to move the picking head 23 to a second position P2 and causes the picking head 23 to perform the release action. In some embodiments, the second position P2 is a region of workpieces. In some embodiments, the second position P2 is a place on a circuit board 3. In the embodiments, the second position P2 is a battery holder 31 on the circuit board 3. The picking head 23 releases vacuum suction to release the battery 4', so that the battery 4' is located on the battery holder 31, as shown in FIG. 12F and FIG. 12G.

Referring to FIG. 11 and FIG. 12C, in some embodiments, the flip-over system 100 further includes an optical detector 24. The optical detector 24 is electrically connected to the controller 21. In some embodiments, the optical detector 24 is located on the mechanical arm 2. The optical detector 24 projects a light spot 241 on the blanking seat 114 to detect whether there is a workpiece 4 that has been flipped over on the blanking seat 114. The optical detector 24 transmits a corresponding signal to the controller 21 when the light spot 241 is covered by a workpiece 4, that is, the optical detector 24 detects that there is a workpiece 4 on the blanking seat 114. The controller 21 actuates, according to the corresponding signal, the movable structure 22 and the picking head 23 to pick up the workpiece 4 on the blanking seat 114. In this way, the mechanical arm 2 may not perform an incorrect gripping action, and workpieces 4 that have been flipped over can be prevented from being stacked on the blanking seat 114. In some embodiments, the optical detector 24 is fixed at a position on a production line. The optical detector 24 projects a light spot 241 on the blanking seat 114. When the light spot 241 is covered by a workpiece 4, the picking head 23 picks up a workpiece 4 that has been flipped over on the blanking seat 114 to prevent the workpieces 4 that have been flipped over from being stacked on the blanking seat 114. In some embodiments, a picking head 23 that picks up a battery 4' from the battery tray 5 and a picking head 23 that picks up, on the blanking seat 114 of the flip-over mechanism 1, the battery 4' that has been flipped over may be the same or different picking heads 23. In other words, there can be one or more mechanical arms 2 or picking heads 23, which is not limited in the present invention.

In addition, referring to FIG. 12D to FIG. 12G, in some embodiments, the battery holder 31 includes a fixed dome 311 inside, which forms an angle of inclination with a bottom surface of the battery holder 31. In some embodiments, the angle of inclination is about 22 degrees, and the angle of inclination is substantially the same as the angle β between the discharging surface 113 and the bottom surface 111 of the flip-over mechanism 1. Therefore, when the picking head 23 sucks, in a vacuum suction manner, a battery 4' that has been flipped over, the battery 4' is in an inclined state and is fittingly assembled in the battery holder 31. However, this is not limited in the disclosure. In some embodiments, a state in which the battery 4' is picked up by the picking head 23 may alternatively be presented as a "flat" state.

According to some embodiments, the flip-over mechanism flips over a workpiece by using the gravity of the workpiece rather than using any other power mechanism, thereby saving maintenance costs. No additional device needs to be installed on the flip-over mechanism, thereby saving equipment costs in a workpiece flip-over process. According to some embodiments, the flip-over mechanism enables the workpiece to be flipped over at a high speed and a high success rate, thereby improving efficiency of an overall manufacturing process. According to some embodiments, the flip-over mechanism includes a blanking seat, and the workpiece is smoothly moved to the blanking seat after being flipped over, which is convenient for a subsequent manufacturing process. In some embodiments, the spacing between the two guiding walls of the flip-over mechanism gradually tapers, so that a workpiece that has been flipped over is gradually located in a process of sliding along the discharging surface, to help quickly enter a subsequent manufacturing process. In some embodiments, the flip-over mechanism is integral, which is convenient for a user to process and assemble the flip-over mechanism on a production line.

The flip-over system includes a flip-over mechanism. According to some embodiments, the flip-over system can save maintenance costs in a manufacturing process. In some embodiments, the flip-over system can save equipment costs in a flipping process of a workpiece. In some embodiments, the flip-over system can improve efficiency of an entire manufacturing process. In some embodiments, the flip-over mechanism includes a blanking seat, and the flip-over system includes an optical detector, so that the mechanical arm can be prevented from performing an incorrect gripping action, and workpieces that have been flipped over can be prevented from being stacked on the blanking seat.

What is claimed is:

1. A flip-over mechanism, comprising:
 a base, comprising a bottom surface and a flipping surface; and
 a guiding element, comprising:
  a feeding surface, wherein there is a feeding angle between the feeding surface and the bottom surface, the feeding angle is greater than or equal to 20 degrees and less than or equal to 90 degrees, the feeding surface faces the flipping surface, an opening direction of the flipping surface faces the feeding surface, and there is a flip-over spacing between the guiding element and the flipping surface; and
  a feeding arc-surface connected to an end of the feeding surface facing the flipping surface, wherein a flipping radius of the flipping surface is larger than a feeding radius of the feeding arc-surface by 10 mm;
 the flipping radius is 20 mm, and the feeding radius is 6 mm.

2. The flip-over mechanism according to claim 1, wherein the base comprises a discharging surface and a blanking seat, the discharging surface is connected to the flipping surface, and the blanking seat is connected to the discharging surface and is lower than the discharging surface.

3. The flip-over mechanism according to claim 2, wherein the guiding element comprises two side walls, wherein the two side walls are located on opposite sides of the feeding surface.

4. The flip-over mechanism according to claim 3, wherein the base comprises two guiding walls, wherein the two guiding walls are located on opposite sides of the discharging surface and opposite sides of the blanking seat, and the two guiding walls are connected to the flipping surface.

5. The flip-over mechanism according to claim 4, wherein a spacing between the two guiding walls tapers from the flipping surface to the blanking seat.

6. The flip-over mechanism according to claim 4, wherein a spacing between the two guiding walls on the blanking seat is less than or equal to a spacing between the two guiding walls on the discharging surface.

7. The flip-over mechanism according to claim 4, wherein a spacing between the two side walls is greater than an outer diameter of a workpiece, a spacing between the two guiding walls on the discharging surface is greater than the outer diameter of the workpiece, and a spacing between the two guiding walls on the blanking seat is substantially equal to the outer diameter of the workpiece.

8. The flip-over mechanism according to claim 3, wherein a spacing between the two side walls is greater than or equal to the flip-over spacing.

9. A flip-over mechanism, comprising:
a base, comprising a bottom surface and a flipping surface; and
a guiding element, comprising a feeding surface, wherein there is a feeding angle between the feeding surface and the bottom surface, the feeding angle is greater than or equal to 20 degrees and less than or equal to 90 degrees, the feeding surface faces the flipping surface, an opening direction of the flipping surface faces the feeding surface, and there is a flip-over spacing between the guiding element and the flipping surface;
wherein the guiding element further comprises a feeding arc-surface, wherein the feeding arc-surface is connected to an end of the feeding surface facing the flipping surface, and a flipping radius of the flipping surface is larger than a feeding radius of the feeding arc-surface by 10 mm;
wherein the base comprises:
a discharging surface, connected to the flipping surface;
a blanking seat, connected to the discharging surface and lower than the discharging surface; and
two guiding walls, located on opposite sides of the discharging surface and opposite sides of the blanking seat, wherein the two guiding walls are connected to the flipping surface, wherein
the guiding element further comprises two side walls, located on opposite sides of the feeding surface;
a spacing between the two guiding walls tapers from the flipping surface to the blanking seat, and a spacing between the two guiding walls on the blanking seat is less than or equal to a spacing between the two guiding walls on the discharging surface;
a spacing between the two side walls is greater than an outer diameter of a workpiece, the spacing between the two guiding walls on the discharging surface is greater than the outer diameter of the workpiece, and the spacing between the two guiding walls on the blanking seat is substantially equal to the outer diameter of the workpiece;
the spacing between the two side walls is greater than or equal to the flip-over spacing.

10. A flip-over system, comprising:
a flip-over mechanism, comprising:
a base, comprising a bottom surface and a flipping surface; and
a guiding element, comprising:
a feeding surface, wherein there is a feeding angle between the feeding surface and the bottom surface, the feeding angle is greater than or equal to 20 degrees and less than or equal to 90 degrees, the feeding surface faces the flipping surface, an opening direction of the flipping surface faces the feeding surface, and there is a flip-over spacing between the guiding element and the flipping surface; and
a feeding arc-surface connected to an end of the feeding surface facing the flipping surface, wherein a flipping radius of the flipping surface is larger than a feeding radius of the feeding arc-surface by 10 mm;
the flipping radius is 20 mm, and the feeding radius is 6 mm; and
a mechanical arm, comprising a controller, a picking head, and a movable structure, wherein the movable structure is connected to the picking head, and the controller is configured to:
actuate the movable structure to move the picking head to a first position for the picking head to perform a picking action;
actuate the movable structure to move the picking head to a position above the feeding surface for the picking head to perform a release action;
actuate the movable structure to move the picking head to a blanking seat for the picking head to perform the picking action; and
actuate the movable structure to move the picking head to a second position for the picking head to perform the release action.

11. The flip-over system according to claim 10, wherein the base comprises a discharging surface and the blanking seat, the discharging surface is connected to the flipping surface, and the blanking seat is connected to the discharging surface and is lower than the discharging surface.

12. The flip-over system according to claim 11, wherein the guiding element comprises two side walls, wherein the two side walls are located on opposite sides of the feeding surface.

13. The flip-over system according to claim 12, wherein the base comprises two guiding walls, wherein the two guiding walls are located on opposite sides of the discharging surface and opposite sides of the blanking seat, and the two guiding walls are connected to the flipping surface.

14. The flip-over system according to claim 13, wherein a spacing between the two guiding walls tapers from the flipping surface to the blanking seat.

15. The flip-over system according to claim 13, wherein a spacing between the two guiding walls on the blanking seat is less than or equal to a spacing between the two guiding walls on the discharging surface.

16. The flip-over system according to claim 13, wherein a spacing between the two side walls is greater than an outer diameter of a workpiece, a spacing between the two guiding walls on the discharging surface is greater than the outer diameter of the workpiece, and a spacing between the two guiding walls on the blanking seat is substantially equal to the outer diameter of the workpiece.

17. The flip-over system according to claim 12, wherein a spacing between the two side walls is greater than or equal to the flip-over spacing.

18. The flip-over system according to claim 10, wherein the base comprises:
a discharging surface, connected to the flipping surface;
a blanking seat, connected to the discharging surface and lower than the discharging surface; and
two guiding walls, located on opposite sides of the discharging surface and opposite sides of the blanking seat, wherein the two guiding walls are connected to the flipping surface, wherein
the guiding element further comprises two side walls, located on opposite sides of the feeding surface;
a spacing between the two guiding walls tapers from the flipping surface to the blanking seat, and a spacing between the two guiding walls on the blanking seat is less than or equal to a spacing between the two guiding walls on the discharging surface;
a spacing between the two side walls is greater than an outer diameter of a workpiece, the spacing between the two guiding walls on the discharging surface is greater than the outer diameter of the workpiece, and the spacing between the two guiding walls on the blanking seat is substantially equal to the outer diameter of the workpiece;

the spacing between the two side walls is greater than or equal to the flip-over spacing.

* * * * *